United States Patent Office 2,762,823
Patented Sept. 11, 1956

2,762,823

ORGANOSILOXANE AMINES

John L. Speier, Jr., Pittsburgh, Pa., assignor to Dow Corning Corporation, Midland, Mich., a corporation of Michigan No Drawing. Application December 17, 1953,
Serial No. 398,898

5 Claims. (Cl. 260—448.2)

This invention relates to organosilicon compounds having organoamine radicals attached to the silicon.

The term "organo functional group" as employed hereinafter refers to an organic group attached to a silicon by Si—C bonds which group also contains a functional organic group substituted therein (i. e., COOH, OH, NH₂, CHO, etc.). The term "organo functional silicon compound" refers to an organosilicon compound containing an organo functional group.

Organosilicon compounds containing organo functional groups which have previously been prepared are generally those containing 4 non-hydrolyzable groups attached to the silicon. These materials could not be polymerized to siloxanes without cleavage of one of the organic groups. This group cleavage is practical only when the organo functional group appears on a silicon atom containing 3 methyl groups or 3 phenyl groups or a combination of these groups. In such cases, the functional organosilicon compound can be polymerized to a siloxane by cleavage of a methyl or a phenyl radical with concentrated sulphuric acid followed by hydrolysis of the resulting silyl sulphate. However, the siloxanes so prepared were inherently dimeric materials and were not capable of further siloxane polymerization. As a consequence the organo functional siloxanes heretofore known have been limited in their applicability.

One of the primary objects of this invention is to prepare amino substituted siloxanes which have greater flexibility of application than has heretofore been possible with such materials. Another object is to provide amino substituted siloxanes which are commercially feasible. Another object is to prepare amino substituted siloxanes which are free from the disadvantage of hydrolytic instability. Another object is to prepare amino substituted siloxanes which can be employed in making polyamide resins. Other objects and advantages will be apparent from the following description.

This invention relates to siloxanes of the formula $$(R''_2NR)R'_bSiO_{\frac{3-b}{2}}$$

where R" is alkyl or hydrogen, R' is a monovalent hydrocarbon radical or a halogenated monovalent hydrocarbon radical, free of aliphatic unsaturation, R is a divalent saturated aliphatic or cycloaliphatic hydrocarbon radical wherein the amino group is attached to at least the third carbon atom away from the silicon and $b$ has a value from 0 to 1 inclusive.

These siloxanes can be prepared by hydrolyzing silanes of the formula $(Y_2NR)R'_bSiX_{3-b}$, where Y is an alkyl radical or a saturated trihydrocarbonylsilyl radical, X is bromine, chlorine or hydrogen and R, R' and $b$ are as above defined. The hydrolysis of these silanes is carried out in the normal manner for hydrolyzing organo silanes. Preferably the hydrolysis is carried out in the presence of an inert solvent such as ether, benzene, toluene or the like. In those cases where Y is a trihydrocarbonylsilyl radical, such as a trimethylsilyl radical, this will also hydrolyze along with the X radical and regenerate the amino group.

The above silanes are prepared by reacting unsaturated amines in which at least one of the active hydrogens have been replaced by trihydrocarbonylsilyl groups, with a silane of the formula R'$_b$SiX$_{4-b}$ in which R', $b$ and X are as above defined. At least one of the X radicals on the silane reactant must be hydrogen. Preferably the X radicals are hydrogen or combinations of hydrogen and bromine such as monophenylsilane, tribromosilane or methyldibromosilane. However, chlorosilanes may be employed also although the yields obtained thereby are inferior.

In carrying out the above reaction it is necessary to block at least one and preferably both of the active hydrogens on the amino group in order to prevent them from reacting with the silane X radicals and producing undesirable products. The active hydrogens are best replaced by reacting the amine with trimethylchlorosilane in the presence of a hydrogen halide acceptor such as pyridine or with hexamethyldisilazane in the presence of NH₄Cl as a catalyst. It is to be understood that any trihydrocarbonylchlorosilane or any hexahydrocarbonyldisilazane can be employed. Preferably the hydrocarbonyl radicals should be saturated. If both of the R" groups are alkyl, the amine may be used, per se, since it contains no active hydrogens.

The reaction between the unsaturated amine or the trihydrocarbonylsilyl derivatives thereof proceeds by means of the addition of the silane to the C=C linkage. The reaction may be represented schematically as follows:

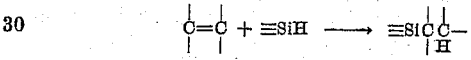

The reaction is best carried out at temperatures from 50 to 150° C. and if desired, a catalyst such as benzoyl peroxide and t-butylperbenzoate may be employed.

For the purpose of this invention the unsaturated amines employed to react with the silane can be aliphatic amines such as allyl amine, undecenyl amine, allymethyl amine, octadecenyl amine, allylstearyl amine and allyldimethyl amine and cycloaliphatic amines such as

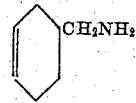

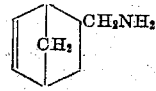

and

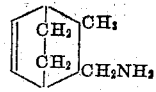

The location of the double bond in the amine employed must be such that in the resulting addition product the silicon atom shall be on a carbon at least 3 carbons away from the amino group. In other words, the amino group must be on a carbon at least gamma to the silicon. Consequently R in the siloxane formula shown above cannot be less than 3 carbon atoms.

From the above it can be seen that R can be, for example, propylene, butylene, octadecylene, cyclohexylene, cyclopentylene,

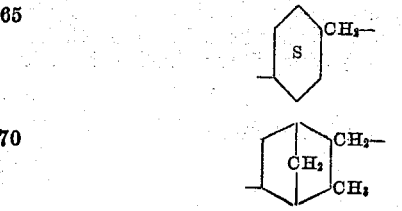

and

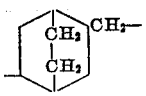

The unsaturated cyclic amines may be prepared by the well-known Diels-Alder reaction which involves the addition of an unsaturated amine to a 1,4-conjugated diene system.

In the siloxanes of this invention R' can be any monovalent hydrocarbon radical free of aliphatic unsaturation such as alkyl radicals such as methyl, ethyl, octadecyl; cycloalkyl radicals such as cyclohexyl and cyclopentyl, and aromatic hydrocarbon radicals such as phenyl, benzyl, tolyl, naphthyl and xenyl. R' can also be any halogenated monovalent hydrocarbon radical free of aliphatic unsaturation such as chlorophenyl, dibromoxenyl, tetrafluoroethyl, pentafluorobutyl, α,α,α, -trifluorotolyl.

The organo functional siloxanes of this invention can be copolymerized with any other siloxanes of the formula

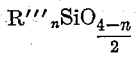

where R''' is any monovalent hydrocarbon or halogenated monovalent hydrocarbon radical and $n$ has an average value from 1 to 3 inclusive. The copolymerization can be carried out by cohydrolyzing the corresponding hydrolyzable silanes in the conventional manner or the functional siloxanes of this invention can be copolymerized with the other siloxanes by means of siloxane bond rearrangement. The relative amount of the functional organo siloxanes of this invention can be varied to any extent, for example, from .001 to 99.999 mol per cent of the copolymer.

The functional organo siloxanes of this invention either alone or when copolymerized with other siloxanes can be reacted with poly functional organic compounds such as dicarboxylic acids to give resinous materials. More specifically the amino substituted siloxanes of this invention can be reacted with dicarboxylic acids to give polyamide resins which are useful for coating and for making fibers. In addition the amino substituted siloxanes of this invention can be reacted via the amino group with other organo functional siloxanes such as those disclosed and claimed in the applicant's copending application filed concurrently herewith. The resins thus obtained are useful for protective coatings and molding compositions.

The organo functional siloxanes of this invention are useful, per se, as surface active agents.

The following examples are illustrative only and should not be construed as limiting the invention which is properly set forth in the appended claims.

*Example 1*

A mixture of 43 g. of N,N'-trimethylsilylallyl amine and 1.8 g. of t-butylperbenzoate was added slowly to 43 g. of monophenylsilane and the mixture heated overnight at 90 to 95° C. Upon distillation of the reaction product an 81 per cent yield of N,N'-trimethylsilyl-3-phenylsilylpropyl amine

was obtained. This material boiled at 180–181° C. at 736 mm. and had a refractive index of 1.4370 and a density of .8208 at 25° C.

When this material is hydrolyzed by adding it to a mixture of toluene and water containing a catalytic amount of NaOH and thereafter heated at 100° C. for 4 hours, the viscous polymeric siloxane having the unit formula

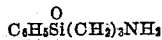

is obtained.

*Example 2*

When 1 mol of dimethylallyl amine,

[CH2=CHCH2NMe2]

is reacted with 1 mol of tribromosilane in the manner of Example 1 the compound Br3Si(CH2)3NMe2 is obtained. When this silane is hydrolyzed by adding it to a mixture of toluene and water and thereafter heated at 80° C. for 5 hours, the siloxane having the unit formula Me2N(CH2)3SiO1.5 is obtained.

*Example 3*

N-trimethylsilylundecenyl amine was prepared by reacting 1 mol of undecenyl amine with 1 mol of hexamethyldisilazane.

16.3 g. of N-trimethylsilylundecenyl amine and 1.3 g. of t-butylperbenzoate were added slowly over a period of 1 to 2 hours to 21.6 g. of monophenylsilane which was heated to 90–95° C. in a nitrogen atmosphere. The temperature of the reaction mixture was maintained for 24 hours. Volatile materials were then removed by heating to 95° C. under a pressure of .01 mm. The residue was the silane

This material had $n_D^{25}$ of 1.4952 and $d_4^{25}$ of .902.

Eight parts of weight of this N-trimethylsilyl-11-phenylsilyl-undecenyl amine was dissolved in dioxane and hydrolyzed with dilute HCl. The acid was neutralized with dilute sodium hydroxide and the solvents were removed under vacuum. The siloxane was dissolved in benzene and the sodium chloride was removed by filtration. After the removal of the solvent under vacuum a clear, brown viscous fluid silanol having the unit formula

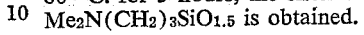

was obtained. This silanol had $n_D^{25}$ of 1.5197 and $d_4^{25}$ of 1.027. When this material is heated with a catalytic amount of KOH the corresponding siloxane having the unit formula

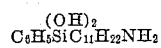

is obtained.

*Example 4*

When 1 mol of the silyl amine

is reacted with 1 mol of methyldibromosilane in the manner of Example 1 the compound

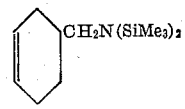

is obtained. When this material is hydrolyzed in accordance with the method of Example 2 the siloxane having the unit formula

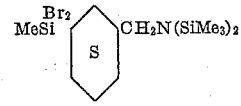

is obtained.

*Example 5*

When 1 mol of the silyl amine

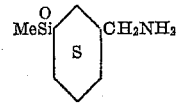

is reacted with 1 mol of chlorophenylsilane,

[ClC6H4SiH3]

in the manner of Example 1 the compound

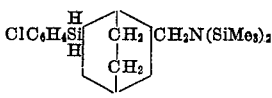

is obtained. When this silane is hydrolyzed in accordance with the method of Example 1 the siloxane having the unit formula

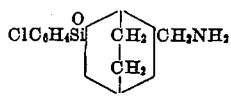

is obtained.

Example 6

When a mixture of 1 mol of N,N-trimethylsilylallyl amine is reacted with 1 mol of methyldibromosilane in accordance with the method of Example 1 the silane

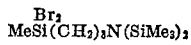

is obtained. When this material is hydrolyzed in accordance with the method of Example 2 the siloxane

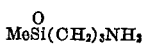

is obtained.

Example 7

When equal molar amounts of the silane

phenylmethyldichlorosilane and trimethylchlorosilane are cohydrolyzed and condensed by adding them to a mixture of toluene and water, removing the acid by washing with NaOH solution and thereafter heating the hydrolyzate at 100° C. with a catalytic amount of potassium hydroxide, a copolymeric silane having the unit formulae

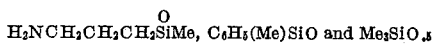

is obtained.

Copolymers are likewise obtained with phenyltrichlorosilane, chlorophenyltrichlorosilane and methylvinyldichlorosilane are cohydrolyzed in a like manner with the aminopropyl silane of this example.

That which is claimed is:

1. A siloxane having the unit formula

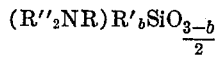

where R'' is selected from the group consisting of alkyl radicals and hydrogen atoms, R is selected from the group consisting of divalent saturated aliphatic and saturated cycloaliphatic hydrocarbon radicals, wherein the amino group is attached to at least the third carbon atom away from the silicon, R' is selected from the group consisting of monovalent hydrocarbon radicals and halogenated monovalent hydrocarbon radicals free of aliphatic unsaturation and $b$ has a value from 0 to 1 inclusive.

2. A siloxane having the unit formula

3. A siloxane having the unit formula

4. A siloxane having the unit formula

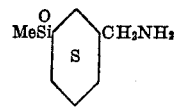

5. A copolymeric siloxane composed of units of the formula

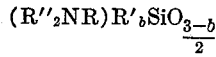

where R'' is selected from the group consisting of alkyl radicals and hydrogen atoms, R is selected from the group consisting of divalent saturated aliphatic and saturated cycloaliphatic hydrocarbon radicals, wherein the amino group is attached to at least the third carbon atom away from the silicon, R' is selected from the group consisting of monovalent hydrocarbon radicals and halogenated monovalent hydrocarbon radicals free of aliphatic unsaturation and $b$ has a value from 0 to 1 inclusive and units of the formula

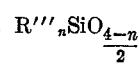

where R''' is selected from the group consisting of monovalent hydrocarbon and halogenated monovalent hydrocarbon radicals and $n$ has an average value of from 1 to 3 inclusive.

References Cited in the file of this patent

UNITED STATES PATENTS

| | | |
|---|---|---|
| 2,238,669 | Wiley | Apr. 15, 1941 |
| 2,557,802 | Sommer | June 19, 1951 |

FOREIGN PATENTS

| | | |
|---|---|---|
| 961,878 | France | May 24, 1950 |